(12) United States Patent
Karaffa et al.

(10) Patent No.: US 8,121,707 B2
(45) Date of Patent: Feb. 21, 2012

(54) METHOD FOR DOWNLOAD OF SEQUENTIAL FUNCTION CHARTS TO A TRIPLE MODULE REDUNDANT CONTROL SYSTEM

(75) Inventors: John Michael Karaffa, Roanoke, VA (US); Justin Chong, Christiansburg, VA (US)

(73) Assignee: General Electric Company, Schenectady, NY (US)

( * ) Notice: Subject to any disclaimer, the term of this patent is extended or adjusted under 35 U.S.C. 154(b) by 365 days.

(21) Appl. No.: 12/423,746

(22) Filed: Apr. 14, 2009

(65) Prior Publication Data

US 2010/0262263 A1    Oct. 14, 2010

(51) Int. Cl.
| | |
|---|---|
| G05B 11/01 | (2006.01) |
| G05B 9/02 | (2006.01) |
| G04B 19/18 | (2006.01) |
| G06F 11/00 | (2006.01) |
| G06F 11/16 | (2006.01) |
| G06F 9/44 | (2006.01) |

(52) U.S. Cl. .............. 700/8; 700/7; 700/19; 700/21; 700/82; 714/6.3; 714/12; 717/170

(58) Field of Classification Search .............. 700/2–4, 700/7, 8, 19, 21, 23, 79, 82; 709/220–222; 714/1–3, 6.3–6.32, 10–12, 48–50, 57; 717/168–170
See application file for complete search history.

(56) References Cited

U.S. PATENT DOCUMENTS

| | | | | |
|---|---|---|---|---|
| 5,761,518 | A * | 6/1998 | Boehling et al. ............. | 710/1 |
| 5,956,489 | A * | 9/1999 | San Andres et al. .......... | 709/221 |
| 6,070,471 | A * | 6/2000 | Westphal et al. ............. | 73/766 |
| 6,085,333 | A * | 7/2000 | DeKoning et al. ........... | 714/6.32 |
| 6,233,703 | B1 * | 5/2001 | Powers ......................... | 714/48 |
| 6,675,258 | B1 * | 1/2004 | Bramhall et al. ............. | 711/114 |
| 6,836,859 | B2 * | 12/2004 | Berg et al. .................... | 714/36 |
| 6,950,878 | B2 * | 9/2005 | Kwok et al. .................. | 709/242 |
| 7,047,440 | B1 * | 5/2006 | Freydel et al. ................ | 714/11 |
| 7,080,371 | B1 * | 7/2006 | Arnaiz et al. ................. | 717/170 |
| 7,539,744 | B2 * | 5/2009 | Matthews et al. ............ | 709/223 |
| 7,669,073 | B2 * | 2/2010 | Graham et al. ............... | 714/1 |
| 7,827,436 | B2 * | 11/2010 | Yang ............................. | 714/4.1 |
| 7,877,627 | B1 * | 1/2011 | Freydel ......................... | 714/11 |
| 2007/0220367 | A1 * | 9/2007 | Smith et al. .................. | 714/48 |
| 2008/0104442 | A1 * | 5/2008 | Diao et al. .................... | 714/3 |
| 2009/0265699 | A1 * | 10/2009 | Toeroe ........................... | 717/168 |
| 2009/0319699 | A1 * | 12/2009 | Canto et al. .................. | 710/17 |

OTHER PUBLICATIONS

U.S. Appl. No. 12/271,373, filed Nov. 14, 2008, William Robert Grubbs et al.

* cited by examiner

*Primary Examiner* — Crystal J Barnes-Bullock
(74) *Attorney, Agent, or Firm* — Fletcher Yoder P.C.

(57) ABSTRACT

Embodiments of the present invention include systems and methods for an online load of logic to a triple module redundant (TMR) control system using a cascading switch and designated controller. Application code having SFC logic may be first downloaded to a designated controller of the TMR system. After download to the designated controller, the other controllers of TMR system may be updated in a cascading (circular) pattern. After updating the second controller with the updated logic, the designated controller may provide correct state information to the second controller.

18 Claims, 7 Drawing Sheets

METHOD FOR DOWNLOAD OF SEQUENTIAL FUNCTION CHARTS TO A TRIPLE MODULE REDUNDANT CONTROL SYSTEM

BACKGROUND OF THE INVENTION

The subject matter disclosed herein relates to control systems, and, more specifically, to configuring redundant programmable controllers.

Control systems for processes, plants, and equipment, may include a wide variety of logic to configure how the control system monitors and controls the processes, plants and equipment. A control system may include one or more programmable controllers. In certain applications, the control system may include a redundant configuration of two, three, or more programmable controllers.

Each controller may execute logic designed to monitor and control the process, plant, and/or equipment controlled by the controller. In certain applications, the logic for the controllers may be updated during operation of the process, plant, and/or equipment to avoid extended downtime. However, each controller in the control system may not be updated at the same time. Further, after update of a controller with new logic, other controllers in the control system may be operating with different information. These differences may result in incorrect or undesired outputs from the control system.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a method includes downloading application code to a first controller of a triple module redundant (TMR) system of three controllers, wherein the first controller comprises a designated controller configured to provide state information to a second controller and a third controller. The method further includes downloading the application code to the second controller after downloading to the first controller and sending state information from the first controller to the second controller.

In a second embodiment, a system includes a triple module redundant (TMR) control system comprising three controllers and a computer configured to provide application code to the control system. The computer comprises a tangible machine-readable medium comprising code adapted to determine a designated controller of the control system and update the designated controller with the application code during an online load. The code is further adapted to update a second controller of the control system with the application code during the online load after updating the designated controller, wherein the second controller receives state information from the designated controller and update a third controller of the control system with the application code during the online load after updating the designated controller and the second controller.

In a third embodiment, a system includes a triple module redundant control (TMR) system comprising a first controller, a second controller, and a third controller, wherein the first controller comprises a designated controller configured to provide state information to the second controller and the third controller, wherein the first controller receives updated application code before the second controller and the third controller such that the first controller comprises an updated state based on the updated application code before the second controller and the third controller receive the updated application code.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Embodiments of the present invention include techniques for online load of logic to a triple module redundant (TMR) control system using a cascading switch and designated controller. Updated logic, such as application code, may be first downloaded to a designated controller of the TMR system. After download to the designated controller, the other controllers of TMR system may be updated in a cascading (e.g., circular) pattern. After updating the second controller with the updated logic, the designated controller may provide correct state information to the second controller. Such state information may include the active step or transition, Boolean values, numerical values, etc. After both the designated controller and second controller are updated, the updated logic may be downloaded to the third controller. After all three controllers are updated and voting resumes, the first controller and second controller may vote the third controller into the correct state.

Figure 1:
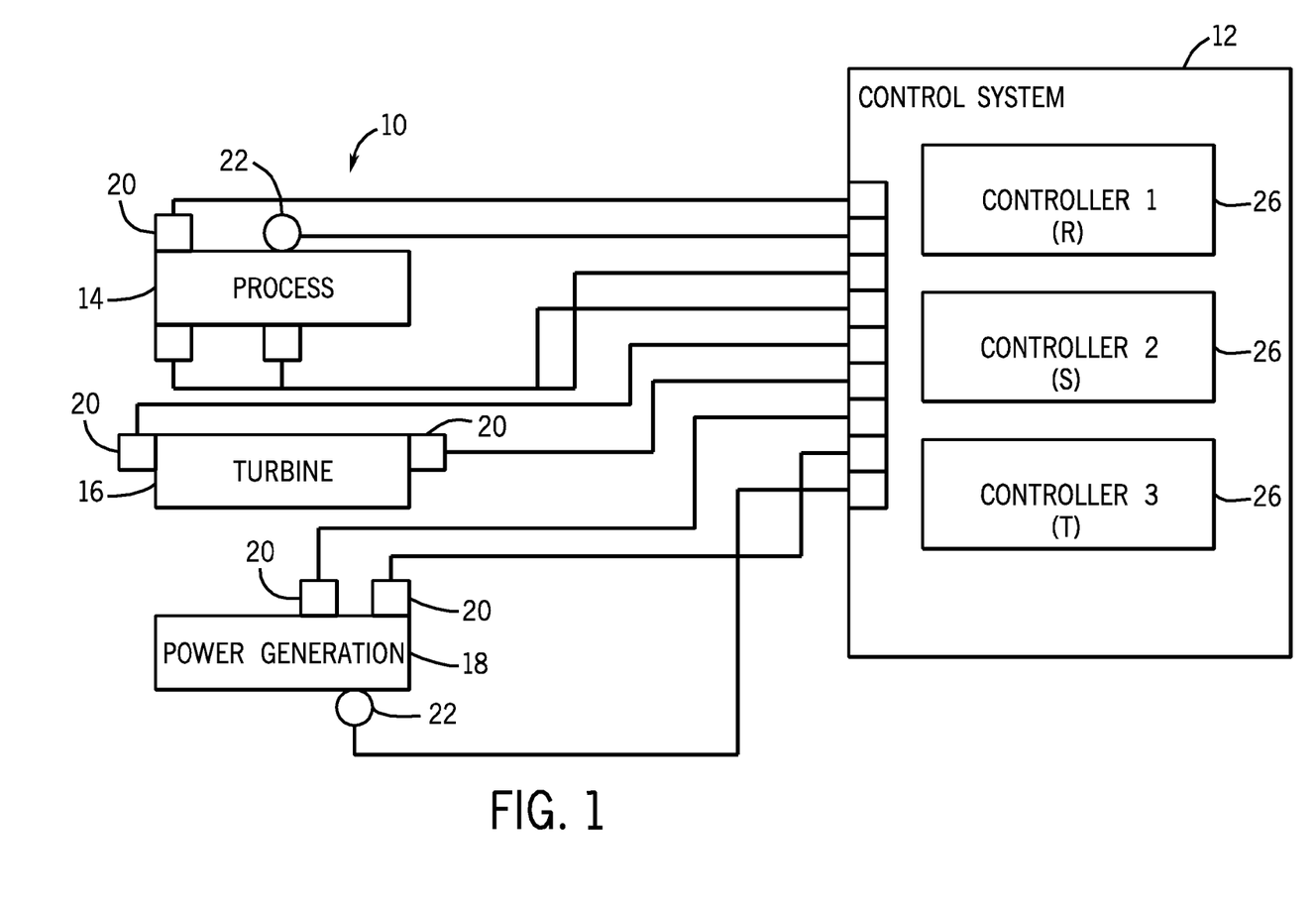
FIG. 1 is a schematic diagram of an implementation of a control system in accordance with an embodiment of the present invention.

FIG. 1 depicts a system 10 coupled to a control system 12 in accordance with an embodiment of the present invention. The system 10 may include, for example, a process 14, a turbine 16, a power generation component 18, or any other component or combination thereof. The process 14 may comprise a variety of operational components, such as electric motors, valves, actuators, sensors, or a myriad of manufacturing, processing, material handling and other applications. Further, the process 14 may comprise control and monitoring equipment for regulating process variables through automation and/or observation. The turbine 16 may include a steam turbine, a gas turbine, a wind turbine, a hydro turbine, or any combination thereof. For example, the turbine 16 may include a combined cycle having a gas turbine, a steam turbine, and a heat recovery steam generation (HRSG) system. Furthermore, the turbine 16 may drive the power generation component 18, which may include an electrical generator. Alternatively, in some embodiments the turbine 14 and/or the power generation component may be solar-powered. The turbine 16 and power generation component 18 may include any number of operational components, such as motors, rotary components, power electronics, sensors, actuators, etc.

The illustrated process 14, turbine 16, and power generation component 18 may include any number of sensors 20 and actuators/motors 22. The sensors 20 may comprise any number of devices adapted to provide information regarding process conditions. For example, the sensors 20 may monitor temperature, pressure, speed, fluid flow rate, vibration, noise, exhaust emissions, power output, clearance, or any other suitable parameter The actuators 22 may similarly include any number of devices adapted to perform a mechanical action in response to an input signal. For example, the actuators 22 may control a fuel injection rate, a diluent or water injection rate, a coolant rate, a power output level, a speed, a flow rate, a clearance, and so forth As illustrated, these sensors 20 and actuators 22 are in communication with the control system 12, such as through interfaces 24. The control system 12 may include one, two, three, or more controllers 26 (e.g., programmable logic controllers) that may operate in any manner suitable for monitoring and controlling the system 10. For example, FIG. 1 depicts a system having three controllers, Controller 1, Controller 2, and Controller 3. Alternatively, these controllers 26 may be referred to as Controller R, Controller S, and Controller. The sensors 20 and actuators 22 may be in direct communication with any or all of the controllers 26. These devices may be utilized to operate process equipment. Indeed, they may be utilized within process loops that are monitored and controlled by the control system 12 and the controllers 26. In certain embodiments, the controllers 26 may be separate and/or integral with the process 14, the turbine 16, and/or the power generation component 18

The three controller system 12 depicted in FIG. 1 and described below may be referred to as a Triple Module Redundant (TMR) control system. In such an embodiment, the three controllers 26 provide three layers of redundancy. In some embodiments, such TMR systems may use a state-voting algorithm between redundant controllers to determine the appropriate state or action of the system 10 being monitored and controlled. The controllers 26 may "vote" to determine the next action (e.g., step) to take in the control logic, based on the state information of each controller 26. The majority vote determines the selected action. For example, in using a state-voting algorithm, two of the controllers, e.g., controllers R and T, having the same state may "outvote" a third controller, e.g., controller S, having a different state. In this manner, the control system 12 may rely on the majority of controllers 26 as providing the correct state (and action) for the system 10 being monitored and controlled.

In some embodiments, it may be desirable to update the control logic to the controllers 26. For example, a user may redesign existing logic or create new logic for the system 12. The logic may be provided as application code to the controllers 26. In one embodiment, the logic may include Sequential Function Chart (SFC) logic. The logic may be downloaded to each of the controllers 26 without stopping the system 12 or taking the controllers 26 "offline." Such a process is referred to as an "online load." However, as SFC logic is downloaded to one of the controllers 26, the updated controller 26 may reset to execute the initial step of the updated SFC logic. After such an update and corresponding reset, the updated controller 26 may have different state information than the remaining controllers. For example, the state information may include the active step or transition, Boolean values, numerical values, etc. The non-updated controllers may have a different active step or transition and different values than the recently updated controller. Additionally, because the updated controller is executing updated logic (e.g., application code) different than the remaining two controllers, the differences in logic may result in different state information and different active steps for each controller 26. In this condition, the voting according to a state-voting algorithm may result in undesirable or invalid states for the control system 12. Embodiments of the current invention include an online load with cascading switch and designated controller to reduce or eliminate undesired or invalid states.

Figure 2A:
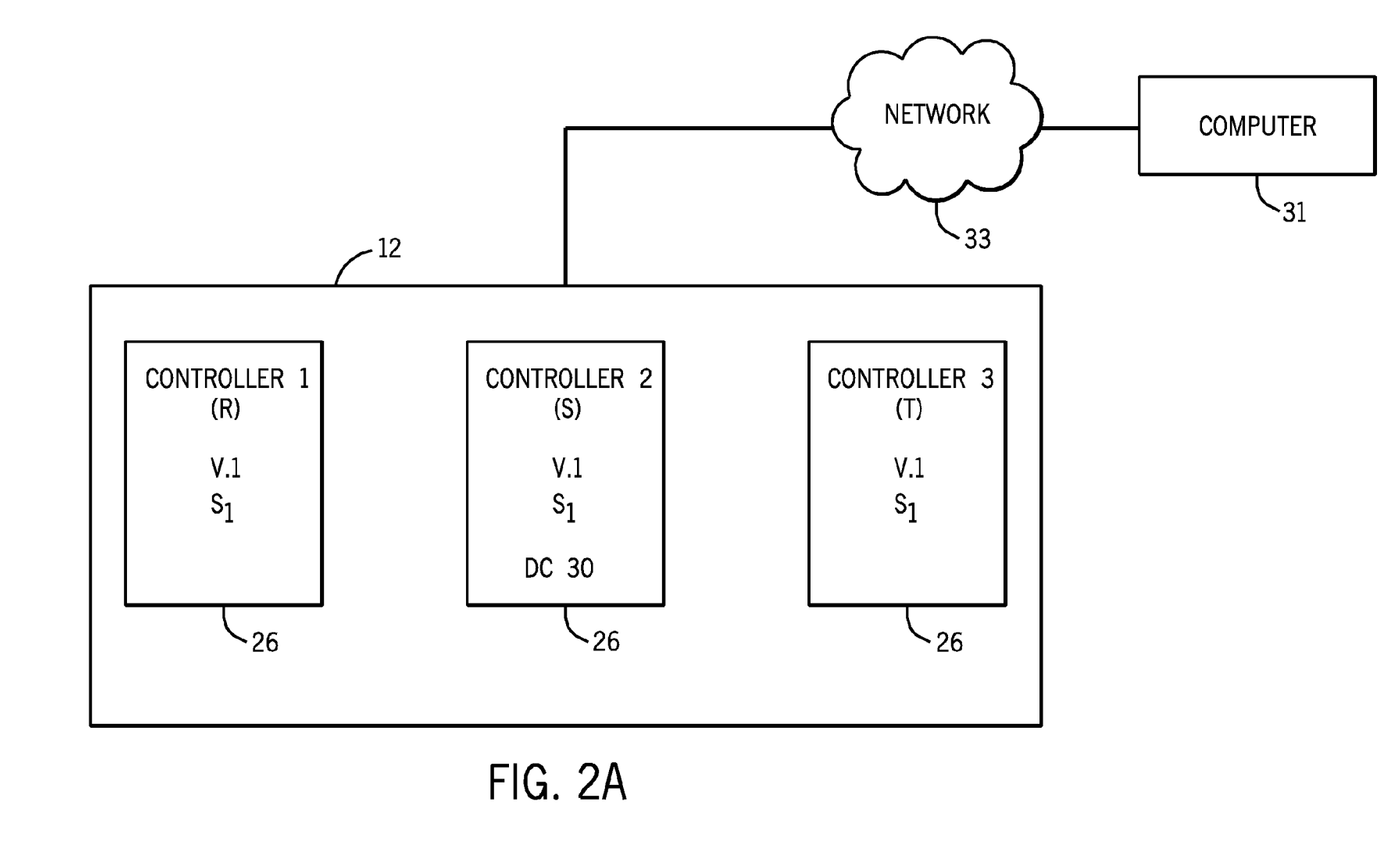
FIGS. 2A-2G depict an online load with a cascading switch and designated controller in accordance with an embodiment of the present invention.

FIGS. 2A-2G depict sequences of an online load with a cascading switch and designated controller for the TMR control system 12 in accordance with an embodiment of the present invention. In addition to providing the three controllers 26, e.g., controller R, controller S, and controller T, the system depicted in FIGS. 2A-2C includes a designated controller 30. As shown in FIG. 2A, the designated controller (DC) 30 is selected from one of the controllers 26 of the control system 12, e.g., controller S. The designated controller of a group of controllers 26 is generally responsible for sending state information to the other controllers. All three controllers 26 are depicted as having a first version of logic (designated "V.1") and as having a first state and set of state information (designated "S.1").

Additionally, to provide for uploading application code to the control system 12, the control system 12 may be coupled to a computer 31 via a network 33. Thus, during the discussion below, it should be appreciated that in some embodiments "updating" the controllers 26 may refer to uploading application code from the computer 31 and downloading application code to the controllers 26. The computer 31 may be any suitable computer, such as a laptop, desktop, server, etc. The network 33 may include any wired network, wireless network, or combination thereof, such as Ethernet, wireless Ethernet, or any suitable network.

Figure 2B:
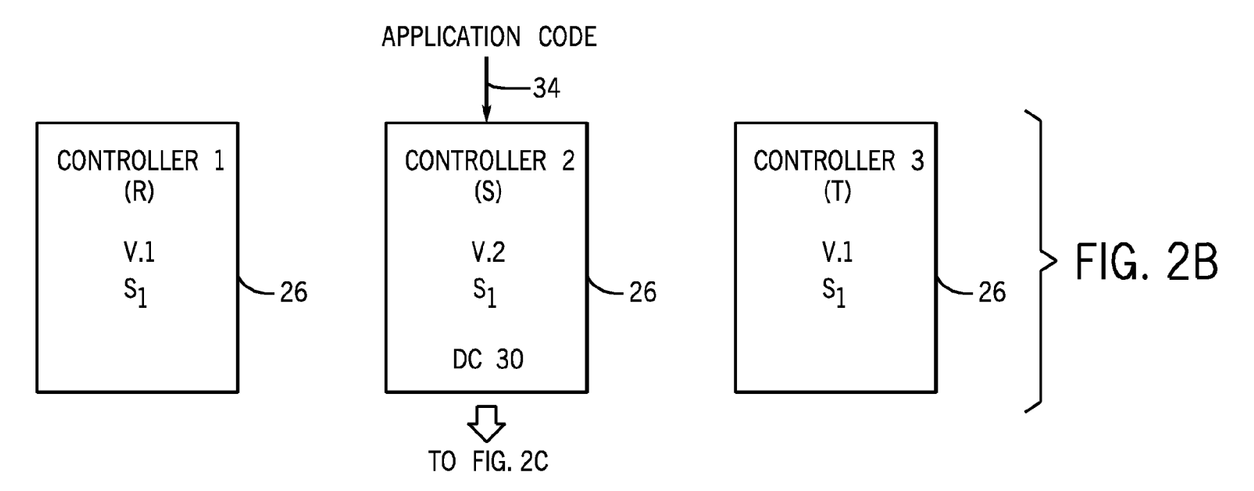
Figure 2C:
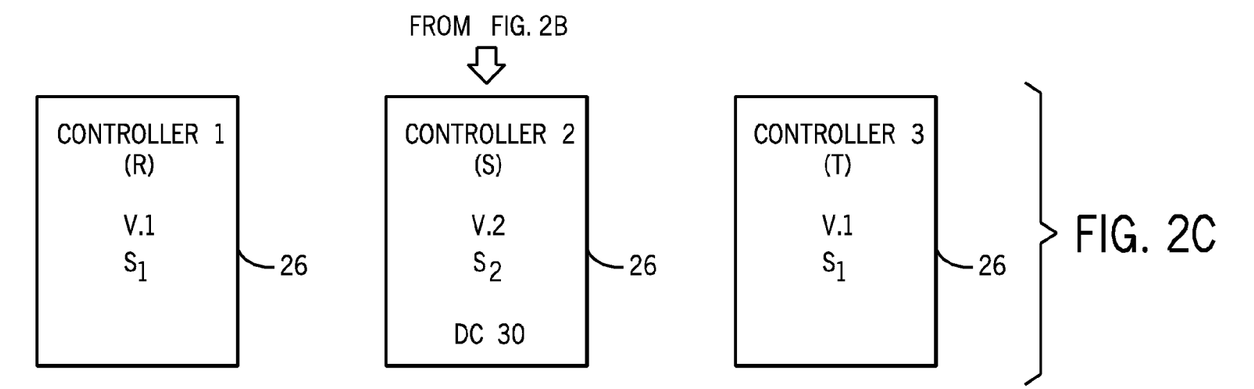

By using the cascading switch technique in combination with the designated controller 30, the possibility of invalid or undesired states may be substantially reduced or completely eliminated. Initially in an online load, as shown in FIG. 2B, the designated controller 30 may be determined and the updated logic (e.g., application code describing SFC logic), may be downloaded to the designated controller 30, controller S, (as shown by arrow 34) before downloading to any other controllers 26. After downloading to the designated controller 30, the designated controller 30 now has the updated logic (designated as "V.2"). Additionally, as shown in FIG. 2C, after the designated controller 30 receives the updated logic V.2, it resets to the initial step of the updated logic V.2 and changes state (designated as S.2). Thus, after the update, the designated controller 30 has different state information (S.2) than the remaining two controllers, controller T and controller S (having S.1). Further, because of the mismatch of the version of each controller (V.2 on one controller and V.1 on two controllers), any voting of the controllers may be suspended.

Figure 2D:
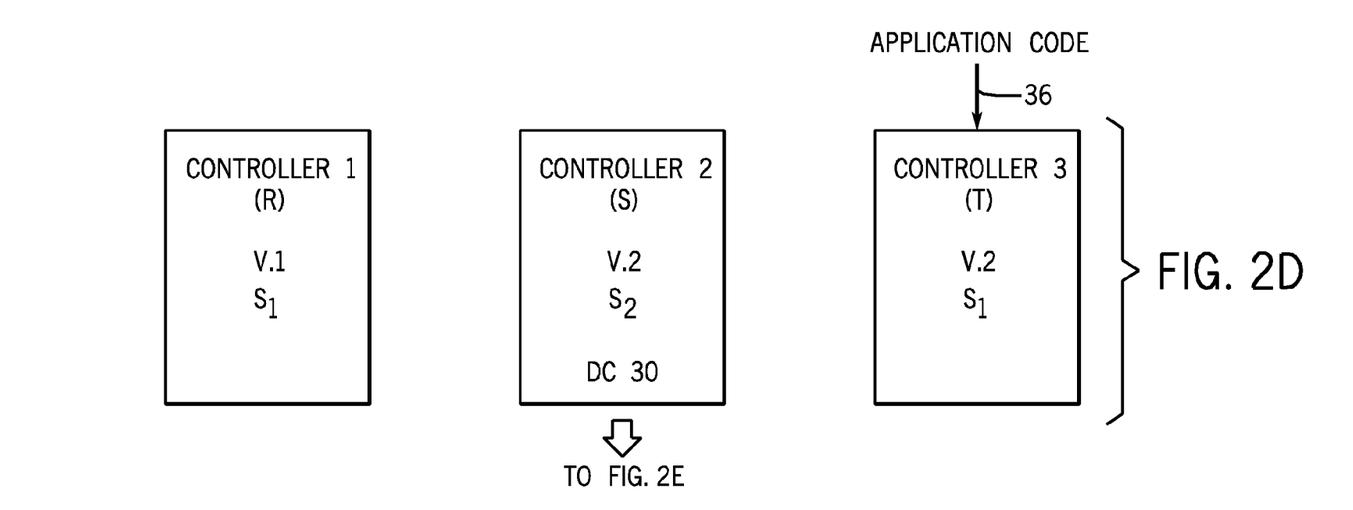

As shown in FIGS. 2D-2G, the remaining controllers, controller T and controller S, are downloaded in a "cascading" manner (also referred to as a "circular rotation"), such that the next controller in the sequence R, S, and T is updated after the designated controller. For example, if the designated controller is controller S, as described above, the next update is controller T and then controller R. Similarly, if the designated controller is controller R, the next update after the designated controller is controller S and then controller T. Thus, as shown in FIG. 2D, the updated logic (e.g., the application code describing SFC logic) is downloaded to controller T (as shown by arrow 36). After downloading to controller T, both the designated controller 30 (controller S) and a second controller (controller T) have the updated logic V.2.

Figure 2E:
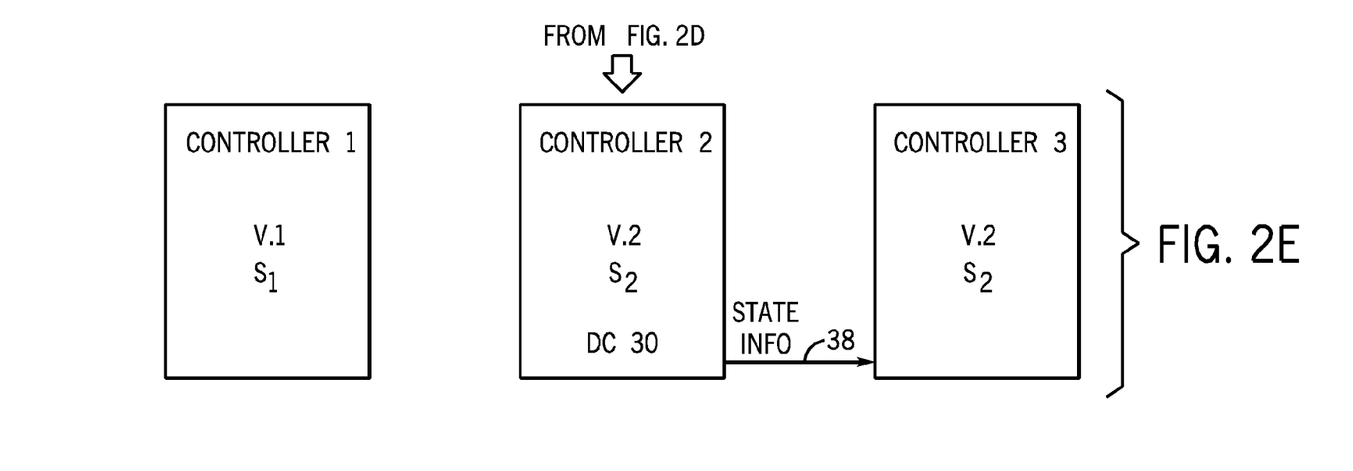

FIG. 2E depicts the next sequence in the online load after updating controller T. As shown in FIG. 2E, after updating controller T with the V.2 logic, the designated controller 30, controller S, may provide state information to controller T (as shown by arrow 38). After updating, both controller S and controller T have state information S.2, i.e., the state information based on the updated logic V.2. By updating the designated controller 30 first, the updated designated controller 30 is running the V.2 logic the longest and thus is able to update other controllers, e.g., controller T, with the most correct state information once those controllers are also running the same logic. As described above, however, once updated all three controllers participate in monitor and control of the system 10 through a stat-voting algorithm.

Figure 2F:
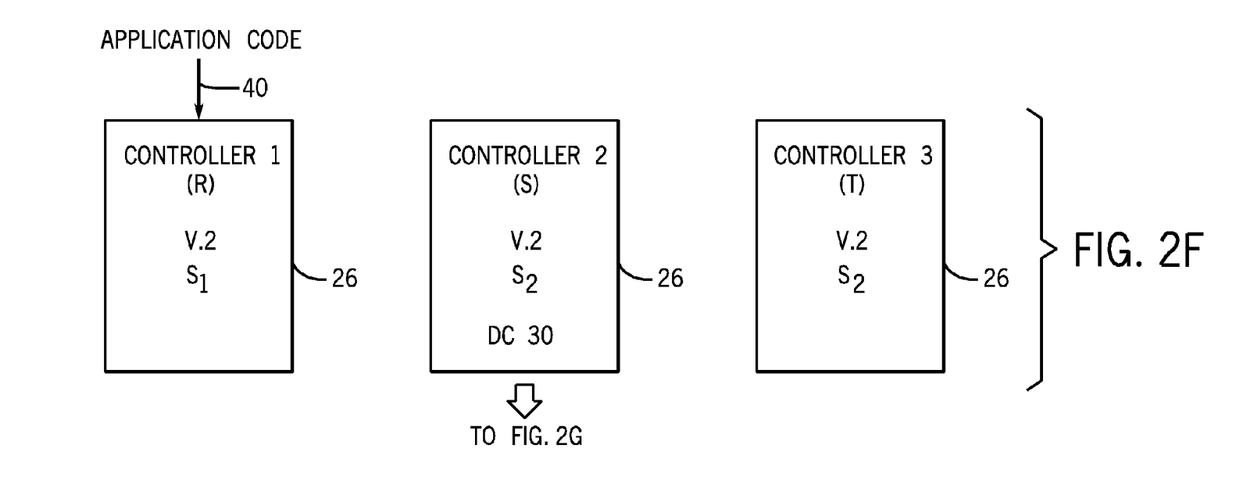
Figure 2G:
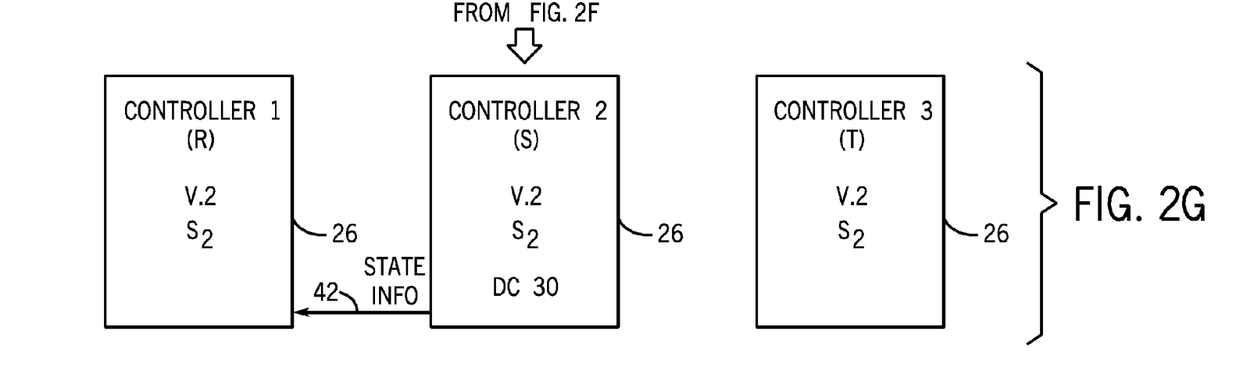

FIGS. 2F and 2G depict a final sequence of the online load illustrating update of controller R. In the final sequence of the cascading switch, the final controller (controller R) in the control system 12 is updated with the updated logic (e.g., application code), as shown by arrow 40 in FIG. 2F. After updating, all three controllers 26 have the updated logic V.2. Both controller S and controller T are running with the correct state information S.2 based on the V.2 logic. In one embodiment, after the third controller (controller R) is updated, voting may be re-established as all controllers S, R, and T are now running the same version (logic V.2) The two controllers having updated states S.2 (controller S and controller T) may outvote the third controller (controller R) into the correct state S.2.

As shown in FIG. 2G, the third controller (controller R) may receive updated state information from the designated controller 30 (controller S), as shown by arrow 42. After updating the state information, all three controllers 26 are running the updated logic V.2 with the correct state S.2. Further, during the online load transition, having one controller with the updated logic (V.2) and the other controllers with the "old" logic (V.1) helps non-state analogs, e.g., those values not included in the state information, of the controllers 26 migrate from old values to new values.

Figure 3:
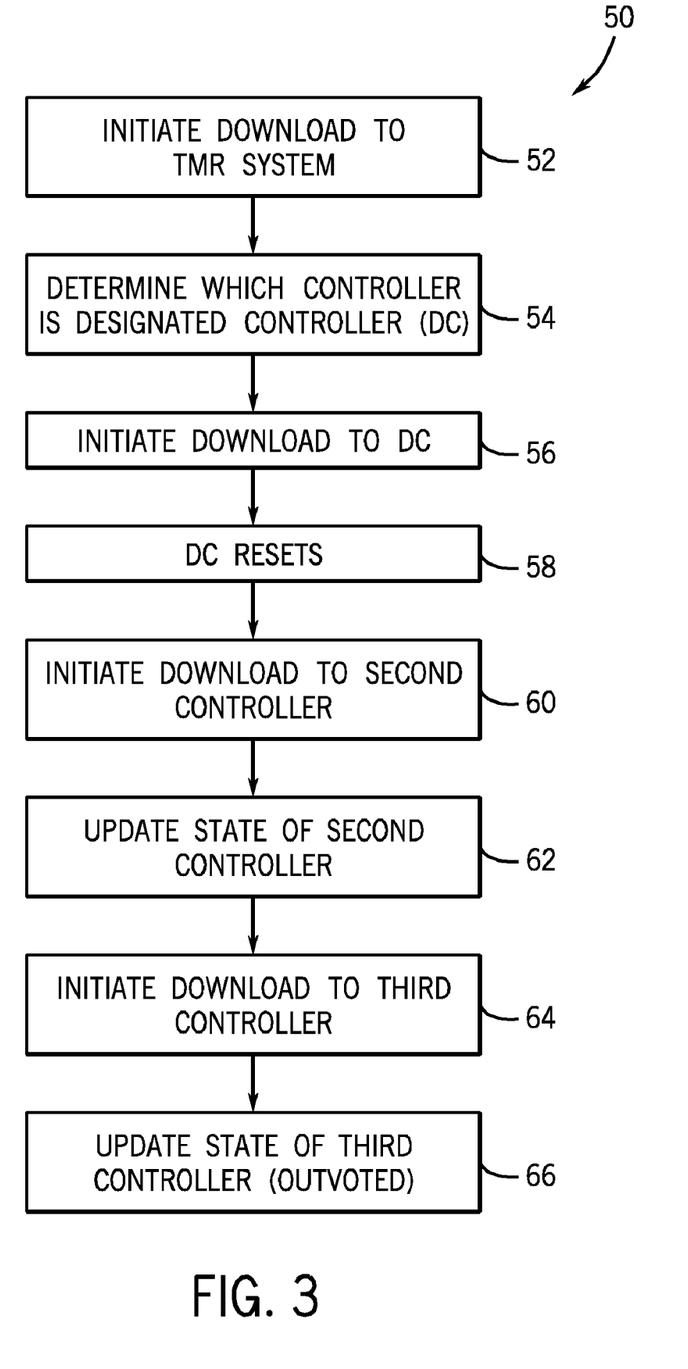
FIG. 3 depicts a process for an online load with a cascading switch and designated controller in accordance with an embodiment of the present invention.

FIG. 3 depicts a process 50 for the online load with a cascading switch and designated controller in accordance with an embodiment of the present invention. Any or all steps of the process 50 may be implemented in hardware, software (such as code stored on a tangible machine-readable medium), or a combination thereof. At the start of the process 50, a download to the TMR control system 12 may be initiated (block 52), such as from the computer 31 coupled to the control system 12. For example, an operator may initiate the request based on updated logic (e.g., application code) for the control system 12. The computer 31 may determine which one of the controllers 26 of the control system 12 is the designated controller (DC) (block 54). For example, the designated controller 30 may provide an indication that it is the designated controller, such as by indicating that it is the controller with the correct state information, it is the first controller (e.g., controller S in the embodiment described above) to be downloaded during an online load, and/or is the controller to provide state information to any controller that returns to the system after a drop out.

After determination of the designated controller, the updated logic (e.g., application code) may be downloaded to the designated controller 30 (block 56), as shown above in FIG. 2B. After downloading, the designated controller may reset (block 58) to the first step of the updated logic, such that new state information may be generated (block 60), as depicted above in FIG. 2C. After update of the designated controller, the remaining controllers 26 may be updated in a cascading (circular right) download pattern. As described above, download to a second controller (e.g., controller T in the above embodiment) may be initiated (block 60), as shown above in FIG. 2D. After download to the second controller, the second controller may receive updated state information from the designated controller (block 62), as shown above in FIG. 2E. Thus, in such an embodiment, the state information is deterministic, i.e., the state of the second controller is determined from the state of the designated controller.

In the final sequence, download of the updated logic (e.g., application code) to a third controller (e.g., controller R in the above embodiment) may be initiated (block 64), as shown above in FIG. 2F. After download to the third controller, all three controllers are updated with the new logic and voting may resume. Because the first two controllers have been updated with the correct state information, the third controller may be outvoted into the correct state (block 66), i.e., to the same state information as the other controllers, as shown above in FIG. 2G.

Figure 4:
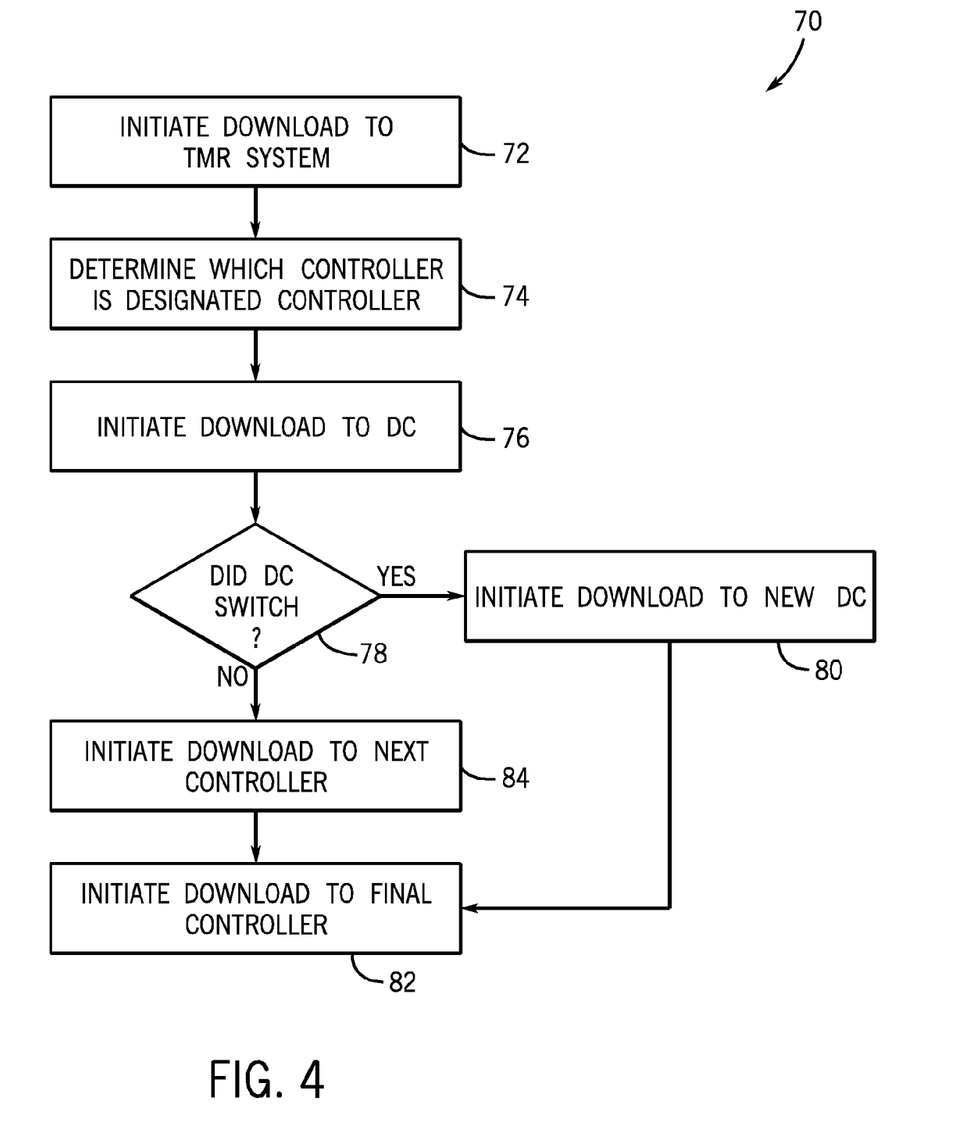
FIG. 4 depicts a process for an online load cascading switch with switching of a designated controller in accordance with an embodiment of the present invention.

In some embodiments, the update to the TMR control system 12 may result in switch of the designated controller from the initially designated controller to another controller. FIG. 4 depicts an online load process 70 during switching of the designated controller in accordance with another embodiment of the present invention. The process 70 may be implemented in hardware, software (such as code stored on a tangible machine-readable medium), or any combination thereof. As described, a download may be initiated to the TMR control system 12 (block 72) and the designated controller may be determined (block 74). After determination of the designated controller, download of updated logic (e.g., application code) to the designated controller may be initiated (block 76). After the update, the designated controller may switch to another controller. The process 76 may determine if the designated controller has switched to one of the other controllers (decision block 78).

If the designated controller switched, the download of the updated logic to the new designated controller is initiated (block 80). After the updated logic is downloaded to the new designated controller, the download of the updated logic is initiated to the final controller (82). By immediately downloading the updated logic to the new designated controller, any state information that may be lost during the time that some controllers are being downloaded is minimized. Although some state information may be lost from the first controller that was downloaded, the first two controllers updated will have consistent and determined state information and will be able to outvote the final controller (as discussed above) after all three are updated.

If the designated controller is not switched (decision block 78) then the download to the next controller is initiated (block 84). After this download, the download to the final controller is initiated (block 82) and all three controllers will have downloaded the updated logic. Accordingly, the state information may be updated from the new designated controller in the manner described above (such as be sending the state information from the designated controller to another controller or by voting a controller into the correct state after voting resumes).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method, comprising
    downloading application code to a first controller of a triple module redundant (TMR) system of three controllers, wherein a first controller comprises a designated controller configured to provide state information to a second controller and a third controller;
    downloading the application code to the second controller after downloading to the first controller;
    sending state information from the first controller to the second controller; and
    switching the designated controller from the first controller to the second controller or the third controller after downloading to the first controller.

2. The method of claim 1, comprising downloading the application code to the third controller after downloading to the second controller.

3. The method of claim 2, comprising sending state information from the first controller to the third controller after downloading to the third controller.

4. The method of claim 1, comprising downloading the application code to the switched designated controller.

5. The method of claim 1, comprising performing voting between the three controllers.

6. The method of claim 1, wherein the application code comprises Sequential Function Chart (SFC) logic.

7. The method of claim 6, comprising resetting the first controller downloading to the first controller.

8. A system comprising:
    a triple module redundant (TMR) control system comprising three controllers: and
    a tangible machine-readable medium comprising code adapted to:
        determine a designated controller of the control system;
        update the designated controller with application code during an online load;
        update a second controller of the control system with the application code during the online load after updating the designated controller, wherein the second controller receives state information from the designated controller;
        update a third controller of the control system with the application code during the online load after updating the designated controller and the second controller; and
        determine a new designated controller after updating the designated controller with the application code.

9. The system of claim 8, wherein the application code comprises Sequential Function Chart (SFC) logic.

10. The system of claim 8, wherein the code is further adapted to update the new designated controller with the application code.

11. The system of claim 8, comprising a turbine, a power generator, and/or combination thereof coupled to the control system.

12. The system of claim 8, comprising a computer configured to provide the application code to the control system, wherein the computer comprises the tangible machine-readable medium.

13. The system of claim 8, wherein the third controller receives state information from the designated controller after voting among the three controllers.

14. A system, comprising:
    a triple module redundant control (TMR) system comprising a first controller, a second controller, and a third controller, wherein the first controller comprises a designated controller configured to provide state information to the second controller and the third controller, wherein the first controller receives updated application code before the second controller and the third controller such that the first controller comprises an updated state based on the updated application code before the second controller and the third controller receive the updated application code; wherein the designated controller is switched from the first controller to the second controller or the third controller after the first controller receives the updated application code.

15. The system of claim 14, wherein the second controller receives the updated state from the first controller.

16. The system of claim 15, wherein the TMR system comprises a state-voting system, such that the first controller and second controller outvote the third controller to the updated state.

17. The system of claim 14, wherein the updated application code comprises Sequential Function Chart (SFC) logic.

18. The system of claim 14, wherein the TMR system is coupled to a turbine system.

* * * * *